Figure 1:
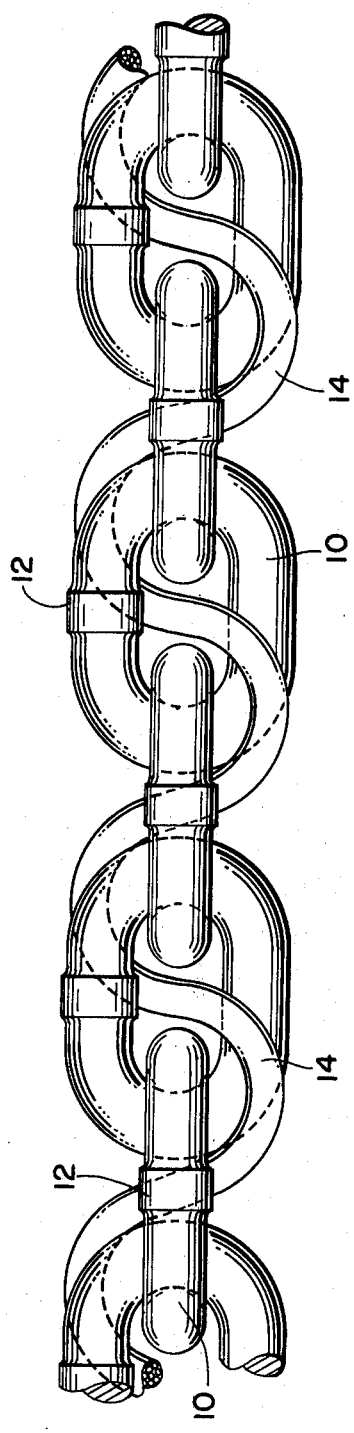

United States Patent [19]
Roberts

[11] 3,973,389
[45] Aug. 10, 1976

[54] SOUND DEADENED CHAIN
[75] Inventor: Alfred M. Roberts, York, Pa.
[73] Assignee: Campbell Chain Company, York, Pa.
[22] Filed: Aug. 11, 1975
[21] Appl. No.: 603,295

[52] U.S. Cl. .................................. 59/35 R; 59/78; 59/90
[51] Int. Cl.[2] .................. B21L 11/00; F16G 13/16
[58] Field of Search ................ 59/78, 78.1, 84, 90, 59/35; 248/49; 152/245, 243, 244; 187/1 R, 15, 20; 191/12 C; 240/78 E

[56] References Cited
UNITED STATES PATENTS

| 847,228 | 3/1907 | Bixby | 59/78 |
|---|---|---|---|
| 1,772,930 | 8/1930 | D'Olier | 59/78.1 |
| 2,110,226 | 3/1938 | Hill | 59/78 |
| 2,179,983 | 11/1939 | Nesbitt | 152/243 |
| 3,264,821 | 8/1966 | Rosenberg | 59/78.1 |
| 3,775,969 | 12/1973 | Vasterling | 59/78 |

Primary Examiner—Lowell A. Larson
Assistant Examiner—Gene P. Crosby
Attorney, Agent, or Firm—Donnelly, Maky, Renner & Otto

[57] ABSTRACT

The chain is formed of a series of links of general C-shape with the link diameter greater than the width of the gap at the ends of each to prevent disengagement therethrough, and a sound absorbing continuous length of sash cord of a diameter substantially equal to the gap width is combined with the chain length by insertion through the link gaps of such cord successively in alternating fashion along the length of the chain.

8 Claims, 2 Drawing Figures

SOUND DEADENED CHAIN

This invention is concerned in general with the elimination or substantial diminishment of the sound that heavy chain, industrial chain, for example, inherently makes as it is manipulated by being paid out, taken up, or variably festooned. A prime example of an environment as above, where the noise would be quite objectionable, is an elevator system for residential and commercial multi-story buildings where chain is very commonly and widely used not for load support but for counterbalancing or stabilizing each elevator car as it ascends and descends.

One version of such an elevator installation is found in U.S. Pat. No. 3,768,596, dated Oct. 30, 1973, and the patent is interesting, not structurally as will be shown, but for several other reasons. For example, it issued to an assignee that has been and is a very substantial manufacturer in the elevator field. It shows, moreover, by its recent dating that the chain noise problem is still of concern although a very old one and, finally, the expedient that it discloses for eliminating chain rattle is to surround alternate links with resilient spacers, a proposed solution that would appear to be fairly expensive and therefore of limited application.

Attention is also called to the much earlier U.S. Pat. No. 2,110,226 which is not concerned with an elevator environment, but is instead cited for a very clear showing in its first two figures of what has been the industry's traditional answer to the problem, namely, to thread a strand of sash cord or rope through the closed links of the chain length from which the rattle is to be either eliminated or greatly reduced, with its ends suitably tied at the working ends of the chain length. It is thought reasonably safe to say that this chain and cord answer or solution to the problem shown in this particular patent can probably be found wherever noise has been a problem and an effort made to eliminate or dampen it. It is, in any event, this type of chain and sound deadening cord combination that the present invention is concerned with.

The long standing and conventional method of applying the cord to the formed length of chain is a manual operation that requires not only the handling of a fair amount of chain, but also reasonable dexterity on the part of the worker responsible for adding the cord by threading the same in and out of the closed links. It is also a tiring job involving regular take up of slack along the cord length as it is longitudinally advanced, the cord of course being tied off or secured in a suitable manner at the ends of the working length of the composite or sound deadened chain.

It is therefore a primary object of the present invention to simplify and expedite the fabrication of such sound deadened chain, thereby to decrease the hand labor required as noted in the foregoing, and worker tedium.

Another object is to provide such a chain that comprises links formed differently from those shown in the noted prior art patents and from the usual welded chain link having round ends and two long sides parallel or slightly bowed or, in other words, commonly known welded industrial chain.

The welded chain itself is and has for a very long time been made by bending a length of wire to the link shape while bringing the opposed ends into abutment, with these ends then heated and upset against each other to form a weld which is then, by hammering and perhaps some other finishing, smoothed for a fairly finished looking joint. The links of the chain employed in the present invention are not in fact welded and, to the contrary, they are intentionally not closed, with a gap of particular dimension being designedly left between the opposing ends of the wire where the weld joint would normally be.

An additional aspect of the invention thus involves a different chain and cord assembly in respect of the configuration of the individual chain links. Such elimination of the joint by welding step as described is obviously another factor in reducing the labor required to make the product and the cost of producing the new chain assembly relative to the type shown by the prior art and in common widespread use.

Other objects and advantages of the present invention will become apparent as the following description proceeds.

To the accomplishment of the foregoing and related ends the invention, then, comprises the features hereinafter fully described and particularly pointed out in the claims, the following description and the annexed drawing setting forth in detail a certain illustrative embodiment of the invention, this being indicative, however, of but one of the various ways in which the principle of the invention may be employed.

Figure 2:
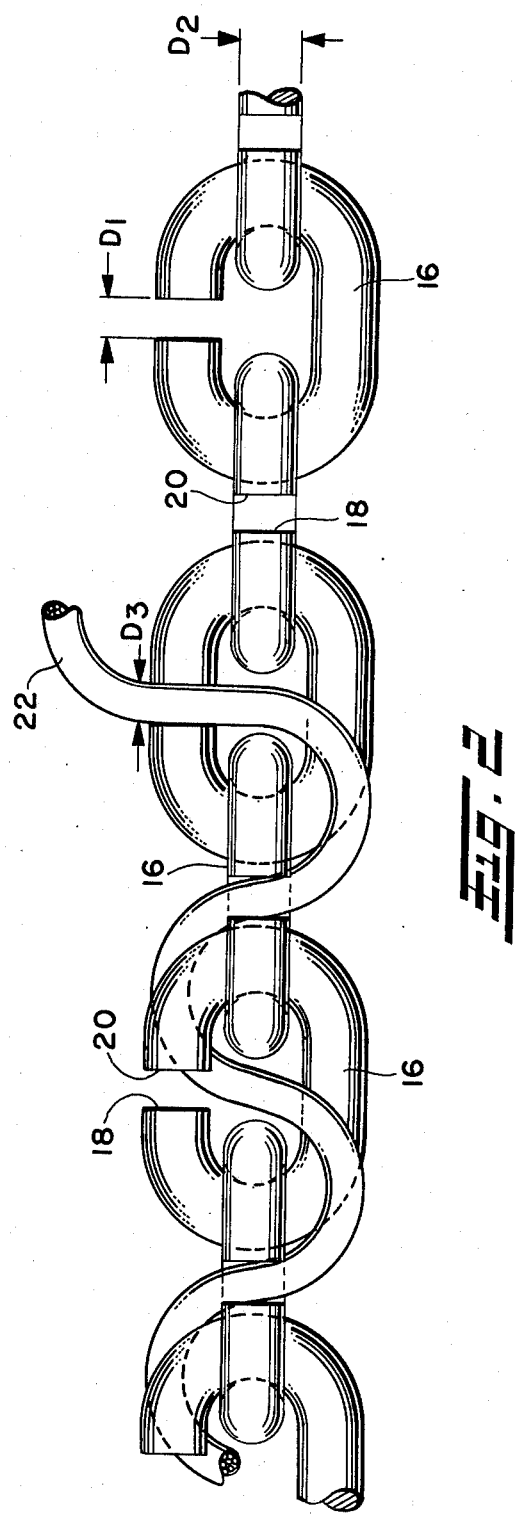

In said annexed drawing:

FIG. 1 illustrates in elevation a fragment of the previously described conventional chain and sound deadening sash cord assembly; and FIG. 2 is a like view of an improved sound deadened chain section according to the present invention.

Referring now to the drawing in detail, reference numeral 10 indicates generally a common industrial welded link, with the weld appearing at 12 and in the drawing looking to be much more of a finished coupling than it is in fact. As mentioned previously, the coupling or completion of the link is primarily achieved by upsetting of the ends against each other to weld them together and then hammering or using other finishing to achieve what appears at least to the customer to be an acceptably finished welded joint. Successive links are formed or engaged about the last welded link in any suitable manner and welded to make the desired length of chain.

The length to be used is thus made as common welded chain, but in this instance the concern is not as much with the tensile or load strength as with its weight or mass, at least as the elevator application as noted above is concerned and any other uses on a similar order. The welded chain is modified for sound deadening by the manual threading longitudinally through the same of a cord 14, actually a multiple fiber strand of nonmetallic material that is alternately passed through the links from opposite sides to form the resultant sound deadened chain shown. As indicated, this type of chain assembly is conventional and will be immediately recognized as such by workers in the art.

Such threading of the flexible, sound absorbent strand, cord, rope or other material, through the successive welded links 10 involves an obvious manual operation, including slack take up, and is generally an operation that can be very tedious and not particularly fast.

It has been noted that the chain used in elevator systems and the like as above indicated does not have an external load function. Accordingly, the prior art use of welded chain has been convenient as far as material supply is concerned, but the tensile strength or loading is not in fact important as compared to the mass or weight of the chain itself. What is important is its compensating weight or mass relative to the cable hoist mechanism by which the car is elevated and returned.

This invention exploits such fact that weight rather than strength is important in such an installation, and utilizes, as shown in FIG. 2, individual links 16 that are not welded, and instead have their opposed ends 18, 20 at one side spaced a predetermined distance D1 apart. The full length of such chain is made up of a series of links which are formed almost in the same manner, with each link being formed about the preceding one, but with all having gaps of the indicated spacing at their opposed ends.

The reason for thus providing the gaps D1 between the opposed ends of each link directly concerns addition of the sound deadening cord 22 or other similar strand material. More exactly, the gap D1 between the opposed ends 18, 20 of each link is smaller than the cross-sectional diameter D2 of each link 16, but equal to or not appreciably smaller than the diameter D3 of the cord 22. The cord can of course be compressed somewhat by hand if needed or desired in the assembly, but this is not considered critical in use when the cord containing chain is elongated and the cord thereby held in line.

Having made an indefinite length of chain with side gaps, it is a relatively easy operation to insert the cord 22 or other strand of sound absorbing material laterally into the links 16. The chain can be freely hung for example in such cord application to the same. It is believed that workers in the art will readily appreciate the small amount of manual labor required to form the woven strand-chain assembly of FIG. 2 by lateral insertion of the cord as compared to the in and out threading which has normally been the practice as illustrated in FIG. 1.

The new chain-cord combination of the invention will thereby be seen actually to require less wire per link and total elimination of the end welding step, while at the same time providing much simpler hand application of the sound absorbing cord.

It is also to be noted that the cord diameter is of significant dimension relative to the link size, and this fairly close relationship is preferably maintained regardless of the change of link size (diameter) employed. Again, the dimensional difference between D1 and D2 is obviously not great, since the assembly likewise benefits from this relation, with all such relative dimensioning thus predicated on the diameter of the chain link to be used.

Workers in the art will additionally appreciate that the slack take-up in a chain of appreciable length using the sash rope or the like in the conventional manner is a large part of the job, while the lateral or side insertion of the cord as described can be accomplished with comparative ease of assembly.

I, therefore, particularly point out and distinctly claim as my invention:

1. Sound deadened chain comprising a series of generally C-shaped metal links, with the stock diameter of each such link being sufficiently greater than the distance between its ends at the gap therein to preclude disconnection through the latter of any other such link coupled thereto, and a length of sound absorbing flexible non-metallic material extending in threaded fashion longitudinally through the series of links, the cross-sectional size of said length of resilient material being substantially the same as the gap distance, whereby the sound absorbing material length can be combined with the chain by lateral insertion of alternating loops of the same through the gaps of the successive links of the chain.

2. Sound deadened chain as set forth in claim 1, wherein the flexible strand is also to a degree resiliently deformable by hand.

3. Sound deadened chain as set forth in claim 1, wherein the cross-sectional size of the sound absorbing material length is not appreciably smaller than the link diameter, but still capable of such lateral insertion through the link gaps.

4. Sound deadened chain as set forth in claim 3, wherein the length of sound absorbing material is sash cord or the equivalent.

5. In the method of making sound deadened chain, the steps of forming a metal link of general C-shape with its ends spaced apart in facing relation to form a gap in the link of predetermined width, the latter being smaller than the link cross-sectional diameter, adding additional links of similar shape about each preceding link, thereby to form a length of chain of such links, and applying a length of non-metallic flexible sound absorbing material to the chain by inserting said material length in alternating lateral directions through the gaps of the successive links, thereby to achieve threading of the material throughout the length of the chain.

6. The method set forth in claim 5, wherein the length of sound absorbing material can to a degree be resiliently deformed by hand to facilitate insertion through the link gaps if needed.

7. The method set forth in claim 5, wherein the cross-sectional size of the sound absorbing material is not appreciably smaller than the link cross-sectional diameter.

8. The method set forth in claim 7, wherein the sound absorbing material used is a length of sash cord or the equivalent.

* * * * *